United States Patent [19]

Vande Sande

[11] Patent Number: 5,433,559
[45] Date of Patent: Jul. 18, 1995

[54] PRESSURIZED HOPPER CAR

[75] Inventor: Jerry W. Vande Sande, Irving, Tex.

[73] Assignee: Trinity Industries, Inc., Dallas, Tex.

[21] Appl. No.: 7,561

[22] Filed: Jan. 22, 1993

[51] Int. Cl.⁶ .................................. B65G 53/26
[52] U.S. Cl. ........................ 406/145; 105/248
[58] Field of Search ............ 406/145, 123; 105/247, 105/248, 358

[56] References Cited

U.S. PATENT DOCUMENTS

| | | | |
|---|---|---|---|
| 2,274,708 | 3/1942 | Kennedy | 406/145 X |
| 2,950,143 | 8/1960 | Koranda et al. | 406/145 |
| 3,088,776 | 5/1963 | Aller | 406/145 X |
| 3,177,042 | 4/1965 | Borger et al. | 406/145 |
| 3,252,431 | 5/1966 | Phillips | 105/248 X |
| 3,420,419 | 1/1969 | Haslett | 105/248 X |
| 3,708,209 | 1/1973 | Dugge | 406/145 X |
| 3,929,261 | 12/1975 | Solimar | 222/195 |
| 4,101,175 | 7/1978 | Kull | 406/123 |
| 4,189,262 | 8/1980 | Anderson | 406/136 |
| 4,286,524 | 9/1981 | Jantzen | 105/248 |
| 4,352,331 | 10/1982 | Anderson et al. | 105/248 |
| 4,353,668 | 10/1982 | Anderson | 406/90 |
| 4,360,295 | 11/1982 | Anderson | 406/75 |
| 4,484,528 | 11/1984 | Anderson | 105/248 |
| 4,484,852 | 11/1984 | Anderson | 414/525 A |
| 4,644,871 | 2/1987 | Arrey et al. | 105/248 X |
| 4,867,073 | 9/1989 | Dugge | 105/358 |
| 4,898,101 | 2/1990 | Harter | 105/247 |

FOREIGN PATENT DOCUMENTS 3402895  8/1984  Germany .................. 105/248

OTHER PUBLICATIONS

Trinity Industries, Inc., Operating Brochure "Power-FLO", PF/RSB-3M-Jun. 1988.
North American Car Corp., "The Unique PD Car, A Totally Flexible Distribution System for Dry Flowable Products" Brochure, no date.
U.S. Trademark No. 1,543,426 registered Jun. 13, 1989, for POWER FLO.

*Primary Examiner*—David M. Mitchell
*Assistant Examiner*—Gary C. Hoge
*Attorney, Agent, or Firm*—Baker & Botts

[57] ABSTRACT

A pneumatic discharge system is provided for a pressurized hopper car to allow the hopper car to carry an enlarged material discharge line. A discharge assembly is used to connect the outlet from each hopper section of the railway car with the discharge line. The discharge assembly is manufactured from pipe having the same dimensions as the discharge line. The discharge assembly allows installing a relatively large diameter discharge line onto an existing pressurized hopper car to optimize unloading of flowable materials without requiring modification to the existing pressurized hopper car. The discharge assembly may include components manufactured from pipe having an outside diameter larger than the clearance between the lower portions of the hopper car and the vertical clearance line of the railway track.

14 Claims, 4 Drawing Sheets

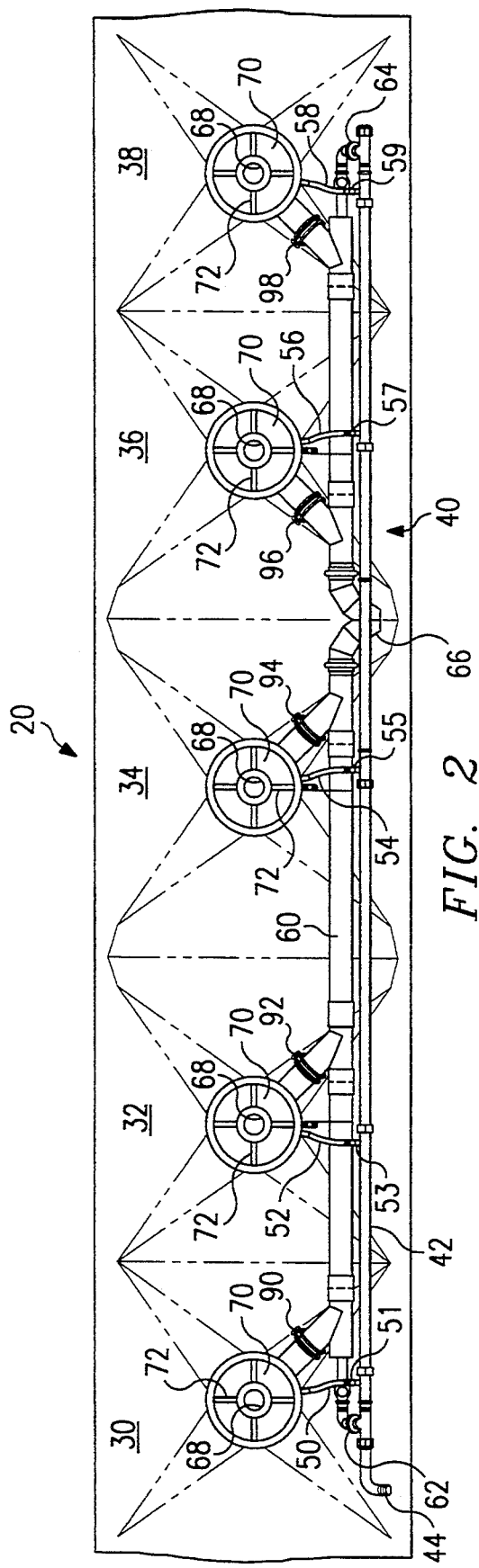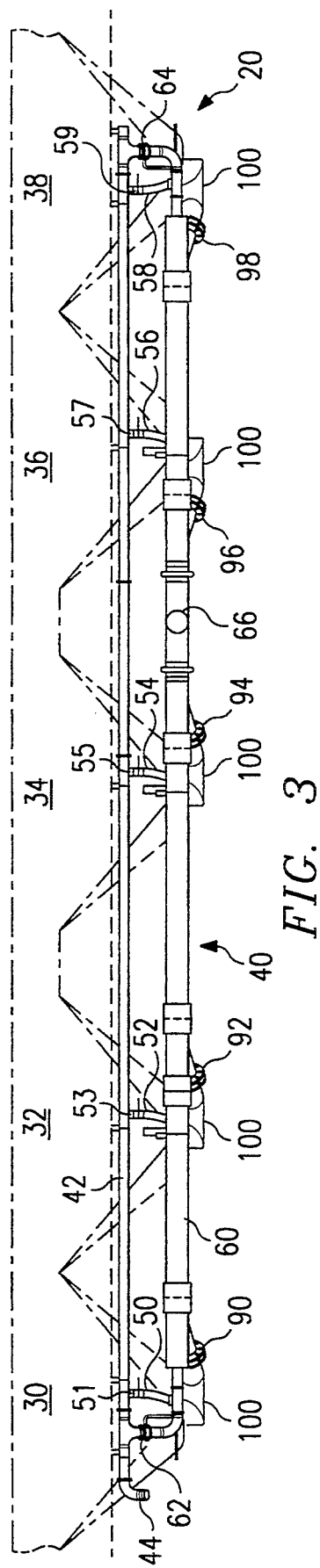

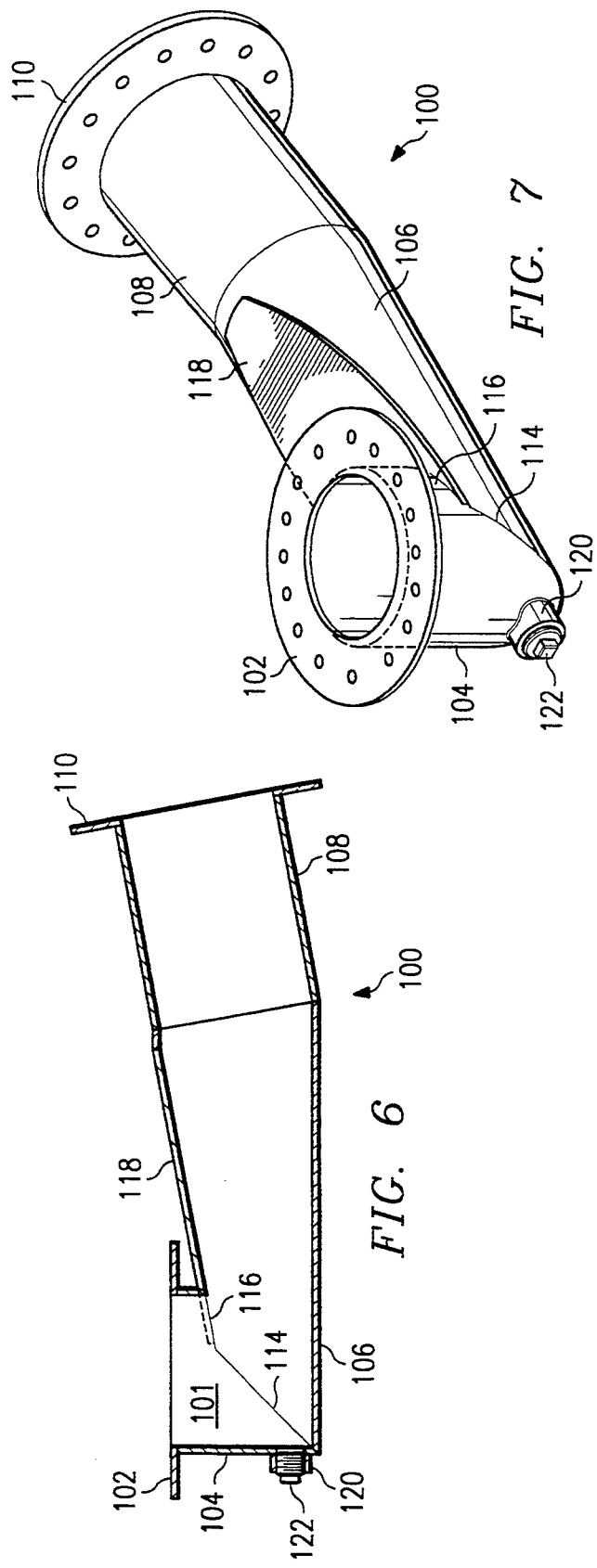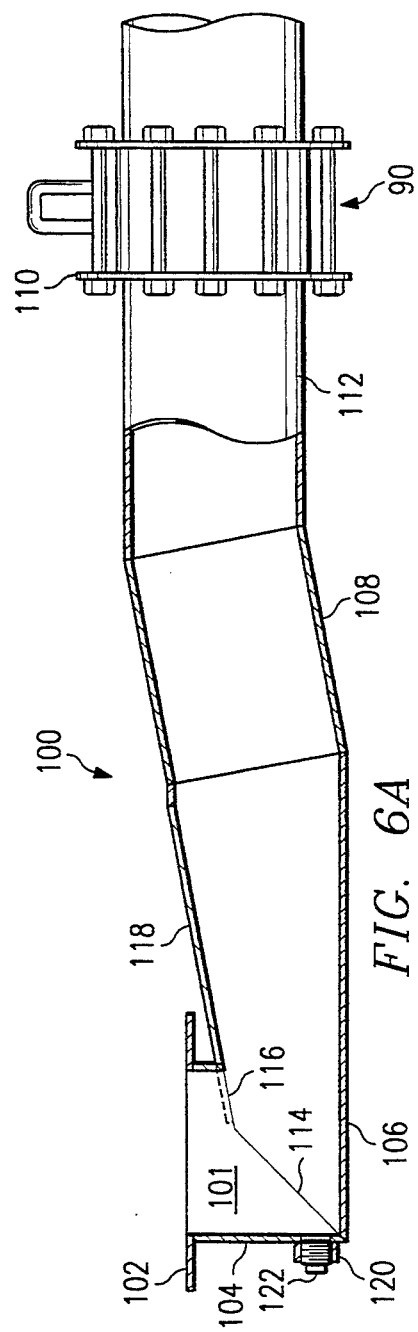

PRESSURIZED HOPPER CAR

TECHNICAL FIELD OF THE INVENTION

This invention is related to pressurized hopper cars and more particularly relates to pressure differential cars which have a positive pressure pneumatic system to discharge dry, flowable products from the car.

BACKGROUND OF THE INVENTION

Enclosed hopper cars with pneumatic systems for unloading the car are well known and frequently used for the transportation of powdered and granular products. For cars with positive pressure pneumatic systems, air is generally supplied from an external source to pressurize the car and simultaneously fluidize the dry, bulk product carried within the car to permit easy discharge from the car. Air pressure within the hopper car during the unloading procedure is typically maintained at 15 PSI.

Frequently, the pneumatic discharge or unloading system associated with pressurized hopper cars will include an air control valve to divert a portion of the air supplied to the hopper car directly into the discharge line. The air pressure in the discharge line is generally maintained at 2 or 3 PSI below the pressure within the hopper car. Pressurized hopper cars with this type of pneumatic unloading system are often referred to as pressure differential cars or pressure discharge cars. Trinity Industries, Inc. manufactures and sells Power Flo ® cars with the previously described pneumatic unloading system.

An example of aeration equipment and a pneumatic discharge system for removing dry, bulk material from hopper style containers is shown in U.S. Pat. No. 3,929,261 entitled "Aeration Device and Method for Assisting Discharge of Material from Containers." This patent is incorporated by reference for all purposes within this application.

Flour, starch and similar food products are examples of dry, bulk material suited for loading, transportation and discharge with an enclosed hopper car having a positive pressure pneumatic unloading system. Any dry powder, granular, or pellet shaped commodity may be satisfactorily transported in such hopper cars. An enclosed hopper car in cooperation with the pneumatic system protects the contents of the car and minimizes loss during the loading, transportation, and the discharge process. Also, pneumatic handling is often the most cost effective, efficient method to handle large quantities of dry, bulk products.

For optimum loading and unloading, interior portions of the railway car are frequently divided into multiple funnel shaped sections or hoppers. Hence, these cars are frequently referred to as "hopper cars." In an effort to maximize the carrying capacity of hopper cars while maintaining a relatively low center of gravity and a relatively low profile to minimize wind resistance, the bottom of each hopper section in the associated hopper car is placed relatively close to the railway track clearance line (vertical curve).

Connections with the hopper car's pneumatic discharge line are generally placed at or near the lowest portion of each hopper section to ensure removal of all product within the car. Due to the requirement for clearance of the railroad track and limitations as to the overall size of pressurized hopper cars, previous cars have generally been limited to a discharge line having an outside diameter of six inches or less. A five inch discharge line is typical for many pressure differential cars.

The types of dry, flowable material carried in pressurized hopper cars has increased significantly and includes a wide range of new products such as fly ash produced from burning large quantities of coal at electrical generating facilities. Considering the generating capacity of a modern electrical plant, it has become increasingly important to be able to rapidly discharge the contents of a pressurized hopper car containing fly ash. Thus, a need has arisen for an improved pressure differential hopper car which has larger diameter discharge piping without requiring substantial modification to existing pressurized hopper car bodies.

SUMMARY OF THE INVENTION

In accordance with the present invention, the disadvantages and problems associated with previous pressurized hopper cars having positive pressure pneumatic discharge systems have been substantially reduced or eliminated. The present invention allows using enlarged discharge piping with presently available pressurized hopper cars having a relatively low track clearance. A larger air supply line may also be added to existing hopper cars to take full advantage of the larger discharger line.

A discharge assembly of the present invention may be used to connect outlets from a pressurized hopper car with an enlarged discharge or product flow line without requiring modification to increase the clearance between the lower portions of the hopper car and the vertical curve clearance line. The discharge assembly of the present invention may be formed from three generally tubular subassemblies to provide a connection between the lower portions of the hopper car and the associated pneumatic discharge line.

A significant technical advantage of the present invention is that the discharge assembly may be used with existing pressurized hopper cars to allow installation of product discharge piping having an outside diameter larger than the clearance between the lower portions of the hopper car and the vertical curve clearance line. The discharge piping may have an outside diameter of 8 inches or greater as a result of the present invention.

Another significant technical advantage of the present invention is that a discharge assembly for use in connecting outlets from a pressurized hopper car to a discharge line may be manufactured and assembled from the same size and type of piping as used in the manufacture and assembly of the discharge line. Thus, a discharge assembly and discharge line having the optimum size for unloading products carried by the hopper car may be easily provided without requiring modification to the lower portion of the hopper car body.

BRIEF DESCRIPTION OF THE DRAWINGS

For a more complete understanding of the present invention, and the advantages thereof, reference is now made to the following description taken in conjunction with the accompanying drawings, in which:

FIG. 2 is a plan view with portions broken away of the pneumatic discharge system incorporating the present invention used with the pressurized hopper car of FIG. 1;

FIG. 3 is a side view with portions broken away of the pneumatic discharge system incorporating the present invention used with the pressurized hopper car of FIG. 1;

FIG. 6 is a drawing in longitudinal section taken along line 6—6 of FIG. 5 showing the discharge assembly; and FIG. 6a is a drawing in section and in elevation with portions broken away showing the discharge assembly of FIG. 5, having a fourth section with a material control valve attached thereto; and FIG. 7 is an isometric drawing showing the discharge assembly of FIGS. 5 and 6.

DETAILED DESCRIPTION OF THE INVENTION

The preferred embodiments of the present invention and its advantages are best understood by referring to FIGS. 1 through 7 of the drawings, like numerals being used for like and corresponding parts of the various drawings.

Railway hopper car 20 may be generally described as a pressure differential car or pressure discharge car which is designed to allow the discharge of dry, flowable products by increasing air pressure within the car to approximately 15 psi above normal atmospheric pressure. After car 20 has been properly positioned for unloading, a source of air pressure such as blower 22 is connected to pneumatic discharge system 40 carried by hopper car 20. Pneumatic discharge system 40 may generally described as a pressure differential or pressure discharge system which is frequently used to unload dry, flowable products from enclosed railway cars such as hopper car 20. Product distribution lines 24 are attached to pneumatic discharge system 40 to direct the flow of material into the desired receiving facility such as tank 26. Product distribution lines 24 may also be used to direct the flow of material into other types of transportation vehicles such as trucks, barges, or ocean-going vessels (not shown).

Figure 1:
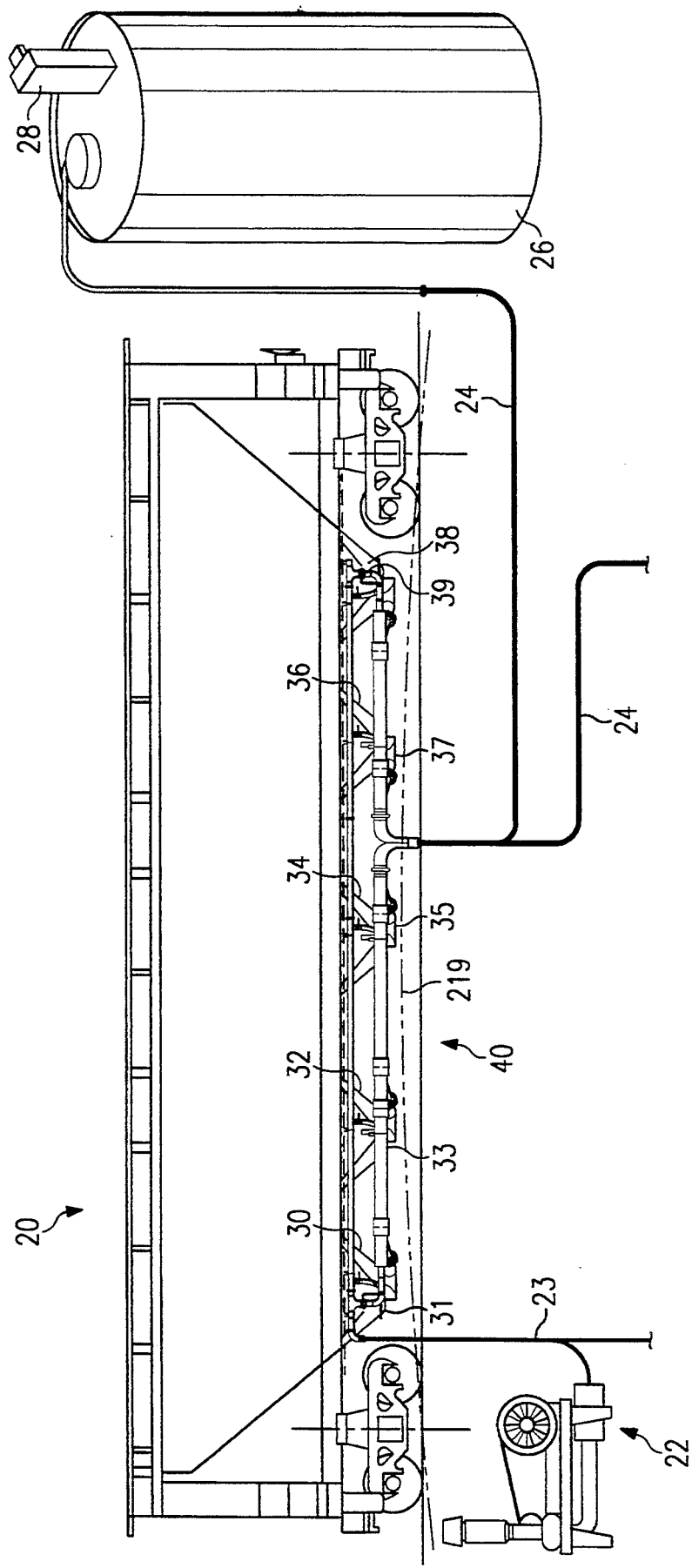
FIG. 1 is an isometric pictorial with portions broken away showing a pressurized hopper car and pneumatic discharge system incorporating the present invention.

A wide variety of receiving tanks and other vessels may be connected with product distribution lines 24. For satisfactory operation of pneumatic discharge system 40, receiving tank 26 or any other vessel receiving material from hopper car 20 should preferably include at least one separator assembly 28 as shown in FIG. 1. Separator assembly 28 functions as a combined outlet vent and filter. Separator assembly 28 ensures the continuous flow of product from railway car 20 into tank 26 by allowing air to escape from tank 26, while at the same time, preventing the escape of any product from tank 26.

Pressurized hopper cars such as railway car 20 frequently include additional components to ensure safe reliable operation of the pneumatic discharge system. These components which are not shown in the drawings, may include one or more safety vents with a ruptured disc to prevent overpressurization of railway car 20. A stand pipe, blow down valve, pressure relief valves and one or more inspection and cleanup ports, which are not shown in the drawings, may also be provided as part of railway car 20. The blow down valve is used to depressurize hopper car 20 after the unloading process has been completed.

Railway car 20 preferably includes a plurality of hopper sections 30, 32, 34, 36 and 38. The present invention may be used with hopper cars having fewer than five hopper sections, or more than five hopper sections. However, railway car 20 is a representative example of an enclosed hopper car with one compartment having five interconnected hopper sections and a pneumatic discharge or unloading system.

As best shown in FIG. 1, the lower portion of each hopper section designated 31, 33, 35, 37 and 39 respectively, is positioned relatively close to the railway track clearance line. The relatively small clearance between the lower portion of each hopper section and the railway track results from optimizing several design factors such as providing maximum load carrying capacity, while minimizing wind resistance and maintaining a low center of gravity. Also, the external dimensions of all railway cars must fit within a maximum allowed operating envelope established by the Association of American Railroads. Therefore, the net result is that enclosed hopper cars such as railway car 20, frequently have a clearance of less than eight inches between lower portions 31, 33, 35, 37 and 39 of their respective hopper sections and the vertical curve clearance line. Vertical curve clearance 219 for railway car is shown in FIG. 1.

Figure 4:
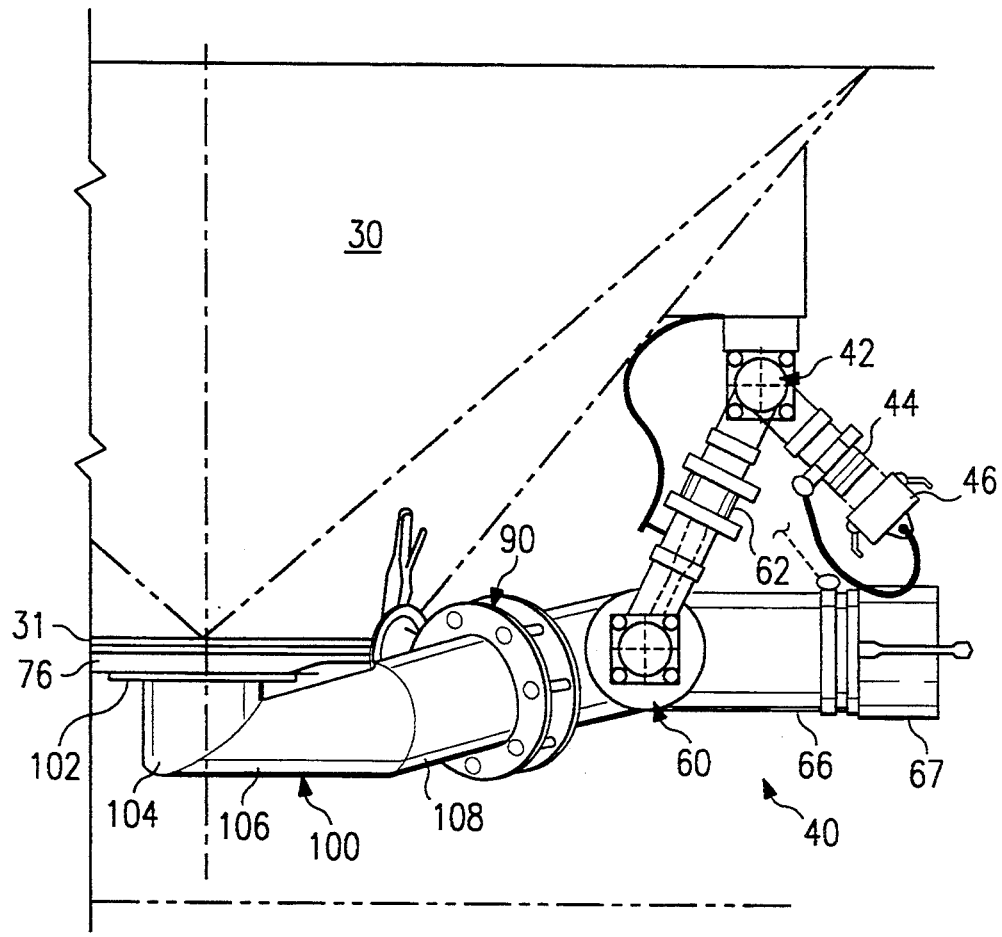
FIG. 4 is an end view with portions broken away showing the pneumatic discharge system incorporating the present invention used with the pressurized hopper car of FIG. 1.
Figure 5:
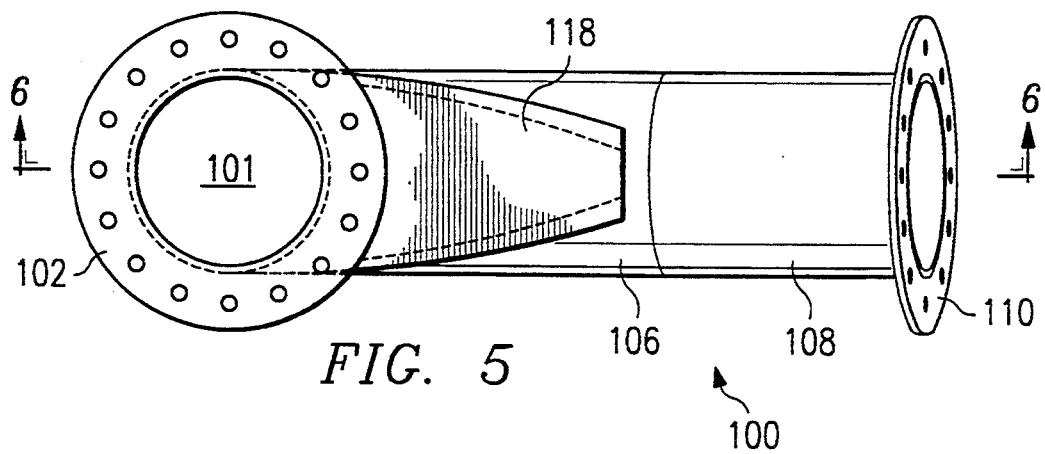
FIG. 5 is a plan view showing a discharge assembly for use with the pneumatic discharge system of FIGS. 2, 3 and 4.

As best shown in FIGS. 2, 3 and 4, pneumatic discharge system 40 includes air supply line 42 and pneumatic discharge line 60. Air supply line 42 and pneumatic discharge line 60 extend longitudinally along one side of railway car 20 adjacent to the lower portion of hopper sections 30, 32, 34, 36 and 38. Inlet coupling 44 is provided at one end of air supply line 42 to allow connecting blower 22 with air supply line 42 via flexible piping or hose 23. As best shown in FIG. 4, inlet coupling 44 also includes dust cover 46, which must be removed prior to attaching air hose 23. As best shown in FIGS. 2 and 3, small diameter aerator lines 50, 52, 54, 56 and 58 connect hopper sections 30, 32, 34, 36 and 38 respectively with air supply line 42. Individual aerator valves 51, 53, 55, 57 and 59 are provided in the respective aerator lines 50, 52, 54, 56 and 58 to control the flow of air to the associated hopper sections 30, 32, 34, 36 and 38.

Each hopper section preferably has sloping sides to direct the flow of dry, bulk material towards discharge outlet or discharge opening 68 at the bottom of each hopper section. As best shown in FIG. 2, aerator pads 70 with hold down strips 72 are preferably disposed around each outlet 68 in the lower portion of each hopper sections 30, 32, 34, 36 and 38. Individual aerator lines 50, 52, 54, 56 and 58 inject air between the respective aerator pads 70 and pressure head 76 associated with the lower portion of each hopper section 30, 32, 34, 36 and 38.

Discharge assemblies 100 are preferably secured to pressure head 76 and are aligned to communicate with outlet 68 from each hopper section 30, 32, 34, 36 and 38. As best shown in FIG. 4, product valves or material control valves 90, 92, 94, 96 and 98 are preferably installed on each discharge assembly 100 for each hopper section 30, 32, 34, 36 and 38 to provide a connection with discharge line 60.

Regulating valves 62 and 64 are provided at each end of air supply line 42 to allow supplying air directly into discharge line 60. Using standard operating procedures for unloading pressurized hopper cars with pressure differential pneumatic systems, individual aerator valves 51, 53, 55, 57 and 59 may be opened and closed in conjunction with the associated material control valves 90, 92, 94, 96 and 98 to control the flow of fluidized material from the respective hopper sections 30, 32, 34, 36 and 38 into pneumatic discharge line 60.

Y-connection 66 is provided intermediate the ends of discharge line 60 to allow attachment with product distribution lines 24. Dust cover 67 is placed on Y-connection 66 when it is not connected to product distribution lines 24. Y-connection 66 is preferably designed to rotate either to an outboard position shown in FIG. 2, or to an inboard position (not shown) which allows the discharge of product to either side of car 20. Y-connection 66 is preferably located between hopper sections 34 and 36 as shown in FIG. 3 or between hopper sections 32 and 34. These locations allow the use of larger diameter discharge piping due to the increased longitudinal spacing between hopper sections 32, 34 and 36 with respect to each other. One reason for including second regulating valve 64 is to provide transport air to discharge line 60 since Y-connection 66 is located intermediate the ends of discharge line 60.

Discharge assembly 100 includes flange 102 which is used to attach discharge assembly 100 to pressure head 76 of each hopper section 30, 32, 34, 36 and 38. Flange 102 is designed to align opening 101 in discharge assembly 100 with the associated discharge opening 68 from each hopper section.

As best shown in FIGS. 6 and 7, discharge assembly 100 includes a first generally vertical section 104, a second generally horizontal section 106, and a third section 108 which is angled upwardly from second section 106. For some applications, an angle of 11° has been found to be the preferred angle for third section 108 relative to second section 106.

Flange 110 is provided on third section 108 for attachment of the individual material control valves 90, 92, 94, 96 and 98. If desired, an additional fourth section 112 (shown in dotted lines) may be added to third section 108 to allow the installation of material control valves 90, 92, 94, 96 and 98 in a generally horizontal position relative to pneumatic discharge line 60.

As shown in FIGS. 6 and 7, discharge assembly 100 may include cleanout port 120 and plug 122 as an optional design feature. In FIG. 4, discharge assembly 100 is shown without cleanout port 120 and plug 122.

An important feature of the present invention is that discharge assembly 100 may be manufactured from the same pipe or tubing used in the manufacture and assembly of pneumatic discharge line 60, even though the outside diameter of pneumatic discharge line 60 may be larger the clearance between lower portions 31, 33, 35, 37 and 39 of hopper car 20 and the vertical clearance line. First section 104 is formed from a generally cylindrical portion of tubing or pipe with flange 102 attached to one end. The other end of first section 104 is preferably cut at a 45° angle along line 114 to intersect with line 116. As best shown in FIG. 6, line 116 is formed by cutting first section 104 at an angle which approximates the angle of third section 108.

Second section 106 of discharge assembly 100 is also formed from the same size and type of tubing or pipe as used in the manufacture of discharge line 60 and first section 104. The end of second section 106 which is engaged with first section 104 is cut to conform with lines 114 and 116.

The upper portion of second section 106 is preferably removed and flat plate or cover 118 installed thereon. Cover 118 extends at an angle upwardly relative to first section 104. The combination of removing the upper portion of second section 106 and installing flat plate 118, is one of the features that allows the use of pipe having a diameter larger than the clearance between lower portions 31, 33, 35, 37 and 39 of railway car 20 and the vertical curve clearance line.

Since the present invention allows installing discharge line 60 having an outside diameter of eight inches or greater, the size of air supply line 42 may be increased from a nominal-diameter of three inches to four or five inches, depending upon the desired unloading rate from railway car 20. Thus, the present invention allows easy replacement of the existing pneumatic discharge system on pressurized hopper cars by installing the desired size discharge assemblies 100 and associated discharge line 60 and air supply line 42 to provide the optimum unloading rate for the dry, bulk material which will be carried within the hopper car. As a result of the present invention, the pneumatic discharge system may be changed each time the intended use of the associated hopper car changes.

The previous written description has been directed towards pressurized hopper cars with a positive pressure pneumatic system. Those skilled in the art will readily recognize that the present invention will allow the use of enlarged discharge lines with hopper cars unloaded by the use of a negative air system. The present invention may also be used with pneumatic unloading systems which combine both positive air pressure within the car and negative air pressure at the receiving location. These combined air pressure systems are sometimes referred to as push-pull systems.

Although the present invention and its advantages have been described in detail, it should be understood that various changes, substitutions and alterations can be made therein without departing from the spirit and scope of the invention as defined by the following claims.

What is claimed is:

1. A pneumatic discharge system for use with a railway car having a plurality of hoppers contained within the railway car for transportation and discharge of flowable materials comprising:

a discharge line connected with each hopper;
means for supplying air to each hopper;
a discharge outlet proximate the bottom of each hopper;
a plurality of discharge assemblies each having a section extending in a substantially vertical direction beneath and in communication with the discharge outlet of a respective hopper;
valve means for controlling the flow of materials from the discharge assembly of each hopper;
each valve means disposed between its respective discharge assembly and the discharge line; and
the discharge line having an outside diameter larger than the clearance between the bottom of the hoppers and the vertical curve clearance line.

2. The pneumatic discharge system as defined in claim 1 further comprising:

the discharge line extending longitudinally adjacent to the lower portion of the hoppers; and the means for supplying air to each hopper including an air supply line extending longitudinally adjacent to the hoppers.

3. The pneumatic discharge system as defined in claim 1 further comprising the discharge line having an outside diameter equal to or greater than eight inches.

4. A pneumatic discharge system for use with a railway car having a plurality of hoppers contained within the railway car for transportation and discharge of flowable materials comprising:

a discharge line connected with each hopper;
means for supplying air to each hopper;
a discharge outlet proximate the bottom of each hopper;
a plurality of discharge assemblies with one end of each discharge assembly communicating with its respective discharge outlet;
valve means for controlling the flow of materials from the discharge assembly of each hopper;
each valve means disposed between its respective discharge assembly and the discharge line;
the discharge line extending longitudinally adjacent to the lower portion of the hoppers;
the means for supplying air to each hopper including an air supply line extending longitudinally adjacent to the hoppers;
a first section extending substantially vertical with respect to the discharge outlet of the respective hopper;
a second section extending substantially horizontal from the first section;
a third section extending at an angle upward from the second section;
a fourth section extending substantially horizontal from the third section; and
each valve means disposed between the fourth section of its respective discharge assembly and the discharge line.

5. A pneumatic discharge system for use with a railway car having a plurality of hoppers contained within the railway car for transportation and discharge of flowable materials comprising:

a discharge line connected with each hopper;
means for supplying air to each hopper;
a discharge outlet proximate the bottom of each hopper;
a plurality of discharge assemblies with one end of each discharge assembly communicating with its respective discharge outlet:
valve means for controlling the flow of materials from the discharge assembly of each hopper;
each valve means disposed between its respective discharge assembly and the discharge line;
the discharge line extending longitudinally adjacent to the lower portion of the hoppers;
the means for supplying air to each hopper including an air supply line extending longitudinally adjacent to the hoppers;
a first section extending substantially vertical with respect to the discharge outlet of the respective hopper;
a second section extending substantially horizontal from the first section; and
the second section of the discharge assembly further comprises a flat portion projecting upwardly from the first section.

6. A railway car having a plurality of hopper sections for use in transporting dry flowable material comprising:

a pneumatic discharge system for use in discharging the material from the hopper sections;
means for supplying air to the hopper sections;
a discharge outlet proximate the bottom of each hopper section;
a discharge assembly connected with each discharge outlet, each discharge assembly having a substantially vertical section extending beneath the discharge outlet of a respective hopper;
a material control valve for controlling the flow of material from each hopper section into a discharge line carried by the railway car;
each discharge assembly disposed between the discharge outlet of the respective hopper section and the material control valve for the respective hopper section; and
the discharge line having an outside diameter larger than the clearance between the bottom of the hopper sections and the vertical curve clearance line.

7. The railway car as defined in claim 6 further comprising the discharge line having an outside diameter equal to or greater than eight inches.

8. The railway car as defined in claim 7 wherein the means for supplying air further comprises an air supply line having a nominal diameter equal to or greater than four inches.

9. The railway car as defined in claim 6 further comprising means for supplying air to the discharge line proximate each end of the discharge line.

10. A railway car having a plurality of hopper sections for use in transporting dry flowable material comprising:

a pneumatic discharge system for use in discharging the material from the hopper sections;
means for supplying air to the hopper sections;
a discharge outlet proximate the bottom of each hopper section
a discharge assembly connected with each discharge outlet;
a material control valve for controlling the flow of material from each hopper section into a discharge line carried by the railway car;
each discharge assembly disposed between the discharge outlet of the respective hopper section and the material control valve for the respective hopper section;
the discharge line having an outside diameter larger than the clearance between the bottom of the hopper sections and the vertical curve clearance line; and
wherein each discharge assembly comprises a first section extending substantially vertical with respect to the discharge outlet of the respective hopper section and a second section extending substantially horizontal from the first section.

11. The railway car as defined in claim 10 wherein the pneumatic discharge system further comprises:

the discharge line extending longitudinally along the lower portion of the railway car; and
the means for supplying air to the hopper sections including an air supply line extending longitudinally adjacent to the hopper sections.

12. The railway car as defined in claim 10 wherein each discharge assembly further comprises a third section extending at an angle upward from the second section.

13. A railway car having a plurality of hopper sections for use in transporting dry flowable material comprising:

a pneumatic discharge system for use in discharging the material from the hopper sections;

means for supplying air to the hopper sections;

a discharge outlet proximate the bottom of each hopper section;

a discharge assembly connected with each discharge outlet;

a material control valve for controlling the flow of material from each hopper section into a discharge line carried by the railway car;

each discharge assembly disposed between the discharge outlet of the respective hopper section and the material control valve for the respective hopper section;

a first section extending substantially vertical with respect to the discharge outlet of the respective hopper section;

a second section extending substantially horizontal from the first section;

each discharge assembly further comprises a third section extending at an angle upward from the second section;

a fourth section extending substantially horizontal from the third section; and the material control valve disposed between the fourth section of its respective discharge assembly and the discharge line.

14. A railway car having a plurality of hopper sections for use in transporting dry flowable material comprising:

a pneumatic discharge system for use in discharging the material from the hopper sections;

means for supplying air to the hopper sections;

a discharge outlet proximate the bottom of each hopper section;

a discharge assembly connected with each discharge outlet;

a material control valve for controlling the flow of material from each hopper section into a discharge line carried by the railway car;

each discharge assembly disposed between the discharge outlet of the respective hopper section and the material control valve for the respective hopper section;

a first section extending substantially vertical with respect to the discharge outlet of the respective hopper section;

a second section extending substantially horizontal from the first section;

each discharge assembly further comprises a third section extending at an angle upward from the second section; and the second section of the discharge assembly further comprises a flat cover projecting upwardly from the first section.

* * * * *